June 10, 1952 J. G. WILSON 2,599,797
METHOD AND DEVICE FOR SENSING SPEED WITH PRESSURE OUTPUT
Filed Oct. 11, 1947 2 SHEETS—SHEET 1
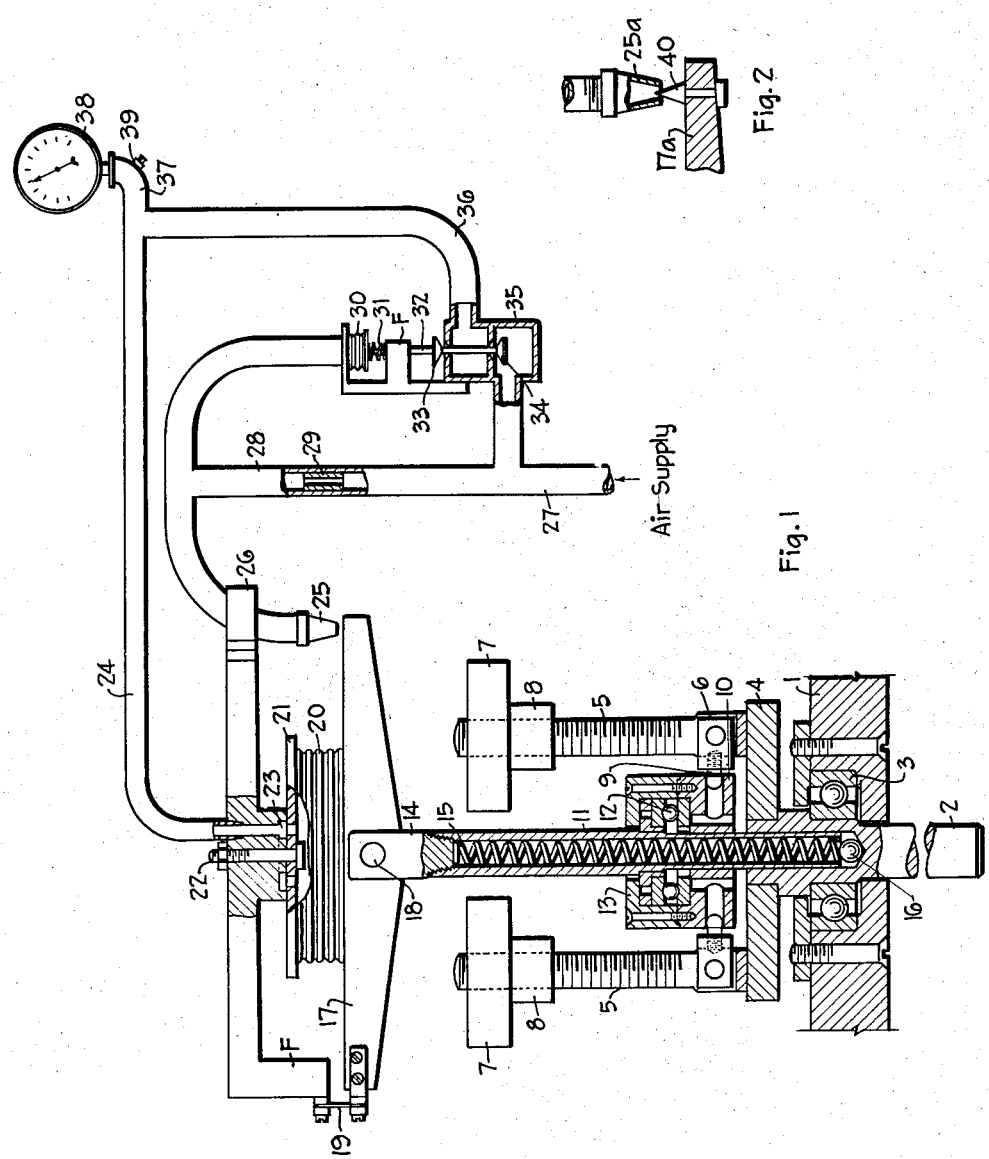
Inventor:
Joseph G. Wilson
By Oswald H. Milmore
his Attorney June 10, 1952  J. G. WILSON  2,599,797
METHOD AND DEVICE FOR SENSING SPEED WITH PRESSURE OUTPUT
Filed Oct. 11, 1947  2 SHEETS—SHEET 2

Inventor:
Joseph G. Wilson
By Oswald H. Wilmore
his Attorney

Patented June 10, 1952

2,599,797

UNITED STATES PATENT OFFICE 2,599,797

METHOD AND DEVICE FOR SENSING SPEED WITH PRESSURE OUTPUT

Joseph G. Wilson, Berkeley, Calif., assignor to Shell Development Company, San Francisco, Calif., a corporation of Delaware Application October 11, 1947, Serial No. 779,323

14 Claims. (Cl. 264—14)

This invention relates to speed sensing units utilizing rotating flyballs in combination with a force balance system for indicating, recording or controlling the speed of machinery or equipment, wherein the indication, recordation or control is effected by variations of the pressure of a fluid, e. g., pneumatically, and to an improved method of sensing speed wherein a fluid is subjected to a pressure dependent upon the speed of a rotating object and the pressure is used to indicate, the speed or to actuate a pressure responsive instrument.

Most governors now available among the mechanical and hydraulic types are not provided with adequate adjustments to enable them to be properly matched to the characteristics of the various types of drivers used in industry. Process instrument systems containing both adequate and independent adjustments for proper matching are readily available and provide satisfactory control of fluid or energy supplied to a system; however, in order to employ one of these instruments, a means of sensing and transmitting indications of speed changes is required. Although systems are available in which speed sensing is based on the rate variations of a hydraulic fluid being pumped, a system wherein the pressure of the fluid is directly indicative of the speed is advantageous because the adjustment and/or calibration of the instruments is thereby simplified. Moreover, a system in which the fluid is a gas is often desirable because it can be operated from the usual instrument air supply and avoids certain difficulties present in hydraulic systems.

It is, therefore, an object of the invention to provide an improved method and device for sensing speed in which speed sensing is based upon fluid pressure, and which is highly sensitive to changes in speed.

A further object is to provide a method of sensing speed and a speed sensing unit which will provide a current of air or other fluid at a pressure varying with the speed of a moving element, such as a rotating shaft, said pressure being substantially independent of the rate of flow of the air current and of the pressure of the air or fluid supply.

Another object is to provide a method and device of the type described wherein the fluid is subjected to a pressure which is directly proportional to the square of the observed or measured speed.

Still another object is to provide a speed sensing unit of the type described having an automatic reset action, whereby changes in the output fluid pressure will be very closely proportional to the square of the speed of the moving element. Ancillary thereto, it is an object to provide an improved speed sensing unit having a fluid relay unit for controlling the inflow and efflux of fluid from the output line in response to changes in speed of the moving element.

Finally, it is an object to provide a method of sensing speed and a speed sensing unit in which the pressure of the fluid in the output line is made to act directly against a surface movable by flyballs with a force depending upon the speed of rotation of the flyballs, whereby, when the device has attained equilibrium, the pressure of the fluid is balanced directly against the centrifugal force of the flyballs. Ancillary thereto, it is an object to provide a device in which the distance of the flyballs from their axis of rotation is always substantially the same when the device has attained equilibrium.

With these and other objects in view, which will become apparent, the invention consists in the arrangement of parts described herein, certain illustrative embodiments of which are illustrated in the drawings forming a part of this specification, wherein:

Fig. 1 is an elevation view, partly in section, of one embodiment of the invention employing a relay valve operated by air pressure;

Fig. 2 is a fragmentary elevation view, partly in section, showing a modified arrangement for regulating the air nozzle;

Figures 3, 4:
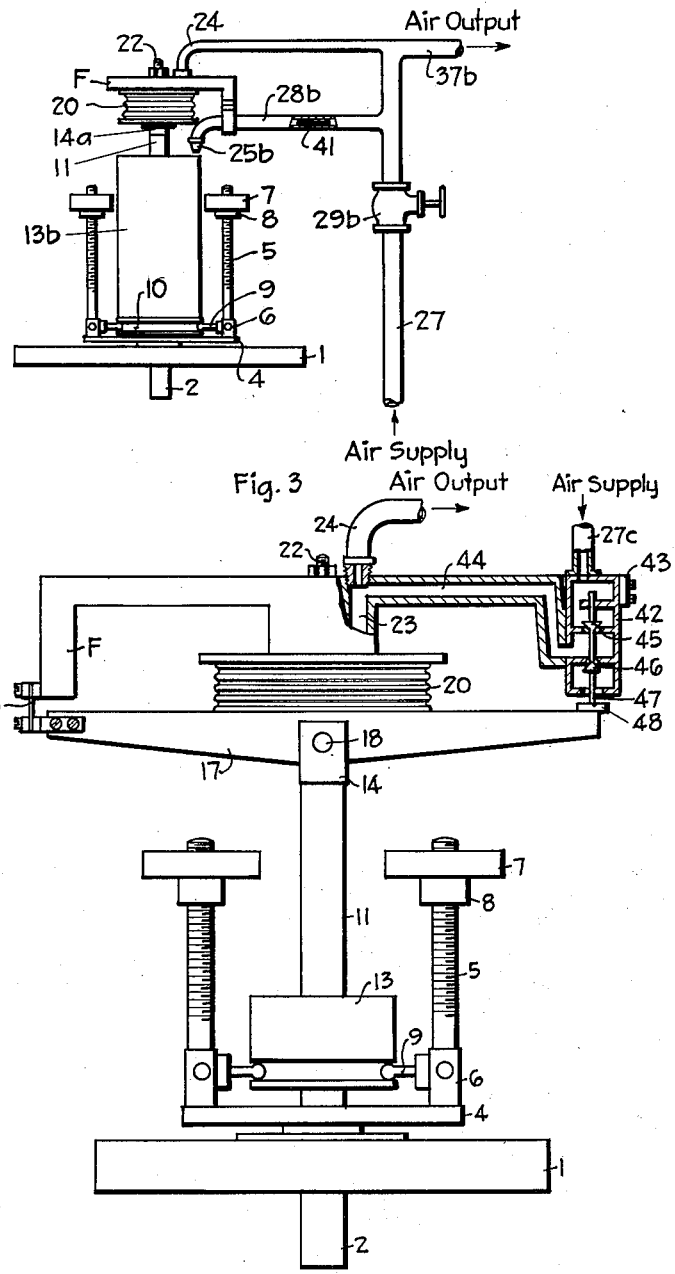
Fig. 3 is an elevation view, partly in section, of a simplified form without a relay valve.
Fig. 4 is an elevation view, partly in section, of a third embodiment employing a mechanically operated relay valve.

Briefly, my invention resides in the arrangement of a flyball mechanism in relation to a fluid pressure responsive element, such as a piston in a cylinder or an air bellows, so that the thrust of the flyball mechanism due to rotation thereof is directly balanced against the force of the fluid pressure responsive element, in combination with means for regulating the pressure of the fluid acting upon the pressure responsive element to permit a balance to be attained. The fluid in the pressure responsive element is connected by a passageway to the indicating, recording and/or controlling device.

To obtain pressures which are directly proportional to the square of the speed of the flyball mechanism, I may, optionally, bias the fluid responsive device to balance exactly the static weight of the movable parts of the unit.

Referring to Fig. 1 of the drawing, 1 represents a supporting base in which a stub shaft 2 is journalled by ball bearings 3. The shaft 2 may be connected by any desired means, either directly or through gearing, to the object, the speed of which is to be measured, recorded or observed, or in response to whose speed a mechanism is to be controlled. The upper end of the shaft has rigidly secured thereto a table or crosspiece 4 on which externally threaded rods 5 are pivotally connected through supports 6. Weights 7, in the form of internally threaded thick metal discs, are adjustably secured to the rods 5 by lock nuts 8 and form the flyballs. Fingers 9 extending radially inwardly from the arms 5 engage a ring 10 having an annular groove which has a close fit with the spherical inner ends of the fingers, whereby the ring 10 is raised or lowered as the arms 5 are swung outwardly or inwardly. A vertical tube 11 extends through the ring 10 into a well in the shaft 2 and is supported thereon through a ball bearing 12, retained by a cover 13. A plug 14 is fixed in the top of the tube 11. From the construction described it is evident that the tube 11 and plug 14 can be held against rotation while the shaft 2 and the parts 4 to 10, inclusive, are rotated, and that the tube 11 can be moved vertically together with the ring 10 and bearings 12 with respect to the stationary support 1 and shaft 2 and table 4.

A long coil spring 15 may optionally be placed within the tube 11. This spring may be either a compression or a tension spring, or may be omitted entirely, depending upon the response desired, as explained below. In the embodiment shown, the spring is a compression spring supported at the bottom on a ball 16 resting in the recess in the shaft 2 to permit rotary movement between the shaft and the spring. The sides and the top of the spring are in engagement with the sides of the tube 11 and with the bottom of the plug 14, respectively.

A lever 17 is pivotally connected between the tines of the bifurcated upper end of the plug 14 by means of a horizontal pin 18. One end of the lever is maintained stationary through a weak leaf spring 19 clamped to a part of the stationary frame F and the other end is free to rise and fall in accordance with the vertical movement of the tube 11. The lever 17 may be regarded as the movable abutment of the flyball mechanism. The frame further supports an air bellows 20, the upper, stationary plate 21 of which is held by a bolt 22 and has perforations in alignment with an annular groove 23 in the frame. This groove is connected by a duct to an air conduit 24. The lower, movable plate of the bellows rests on the lever 17, urging it and the tube 11 downward in accordance with the air pressure within the bellows. The free end of the lever 17 is flat on top. A fluid discharge device, in the form of an air nozzle 25, is supported on the frame F by a bracket 26 so as to have its orifice near to and parallel to the flat upper surface of the lever which forms a baffle for varying the rate of discharge of air through the nozzle.

Air under pressure, preferably from a regulated, constant pressure source (not shown) is fed through the conduit 27, which is connected to the conduit 28 and the nozzle 25 through a restriction such as a plug 29 having a narrow flow channel, or an adjustable throttle valve. A branch of the conduit 28 is connected to a small air bellows 30 supported by another part of the frame F. The lower, movable plate of the bellows is normally urged upwardly by a spring 31 and is fixed to the top of an actuating rod 32 carrying a pair of control valves 33 and 34 adapted to cooperate with orifices in the top wall and in a transverse partition, respectively, of the relay valve 35. These valves are shown to be conical, but valves of other known types may be substituted, e. g., tapered pins. The lower chamber of the relay valve 35 is connected directly to the air supply conduit 27 and its upper chamber is connected to a line 36. It will be noted that the lower valve 34 regulates the flow of air from the lower chamber into the upper chamber, while the valve 33 regulates the escape of air from the upper chamber to the atmosphere through the top wall. When the rod 32 is fully depressed the valve 33 is seated and the valve 34 is fully open thereby causing the air pressure in the conduit 36 to rise to a maximum; when it is fully lifted the valve 34 is closed and the valve 33 is fully open, thereby reducing the pressure in the conduit 36 to zero gauge, i. e., to atmospheric pressure. The pressure in the conduit 36 will assume a value intermediate to these extremes in accordance with the position of the rod 32, as determined by the air pressure in the bellows 30 and the spring 31. The maximum pressure will be equal to the pressure in the conduit 27 in the case wherein the receiving instrument, e. g., indicating, recording or control instrument draws no air. In many applications of the device, however, such receiving instruments continually vent or bleed a small amount of air, and the maximum pressure will be somewhat less, depending upon the pressure drop due to the constriction between the upper and lower chambers of the relay valve.

The conduit 36 is connected to the conduit 24 and to a branch 37. The branch 37 forms the fluid output line and may be connected to a pressure responsive instrument of any type, e. g., the pressure gauge 38, which may be graduated in pressure units or in revolutions per minute.

In operation, the shaft 2 is rotated at a speed equal to or proportional to the speed of the mechanism to be observed, and the tube 11 is urged upwardly by the spring 15 and by the centrifugal force of the weight 7. The upward thrust is counteracted by the weight of the vertically movable parts, including the lever 17, and by the bellows 20 which is supplied with air under pressure from the conduit 27 through the relay valve 35 and conduits 36 and 24. When equilibrium has been established the downward force of the bellows exactly balances the net upward thrust of the tube 11. Since this downward force is exactly proportional to the air pressure in the bellows and in the conduits 24 and 37, it is evident that the pressure indicated by the gauge 38 will likewise be directly proportional to the net upward thrust of the tube 11. By this means I "weigh" or balance the thrust of the flyball mechanism directly against the air pressure, and use this air pressure for actuating or controlling any receiving instrument.

The functioning of the device is as follows: Assume that the device is in operation and that the rod 32 is in the proper position to establish the above-mentioned equilibrium condition. Assume, further, an increase in the speed of the shaft 2. The resulting increase in the centrifugal force of the weights will disturb the balance of forces and cause a slight rise in the tube 11. This will simultaneously raise the free end of the lever 17 and move it closer to the stationary orifice of the nozzle 25, thereby restricting the air which is continually bleeding from the nozzle. The pressure drop across the plug 29 is thereby reduced and the pressure in the bellows 30 is consequently increased; the bellows 30 thereupon lowers the rod 32 and the control valves supported thereon, whereby the pressure in the conduit 36 is increased in the manner previously described. This increased pressure is transmitted to the fluid pressure output line 37 and also to the main bellows 20, until the force of the bellows again balances the net upward thrust of the tube 11. As the pressure in the main bellows 20 increases, it slightly overbalances the upward thrust of the tube 11 and depresses it; the baffle formed by the free end of the lever 17 is thereby moved away from the nozzle 25, until a new equilibrium is reached at an air pressure higher than at the initial equilibrium condition.

A decrease in speed of the shaft 2 will result in an equilibrium being established at a lower air pressure in the line 36, main bellows 20, and the air output line 37. In the case of receiving instruments which do not bleed off air continuously, the air pressure in the system is reduced entirely by the escape of air through the upper orifice in the relay valve (past the valve 33) and it is necessary to construct this orifice of sufficient size to permit the necessary amount of air from the bellows and the conduit 37 to bleed off in a reasonable amount of time. When the volumetric contents of the air conduits 36—37—24 is high, it is desirable to use instruments which bleed air continuously or to provide a bleed port 39.

It is also possible to substitute a simpler relay valve having only the control valve 34 for controlling the flow of high pressure air, and to rely upon the port 39 or upon the consumption of fluid by the receiving instrument for bleeding off air when the pressure in the system must be reduced to attain equilibrium at a lower pressure.

The vertical thrust imposed upon the tube 11 by the centrifugal force of the weights 7 is proportional to the square of the angular velocity and to the radial distance from the axis of rotation to the center of mass of the movable weights. In the device described the distance of the weights from the axis of rotation can be made to remain essentially constant, i. e., it is possible to construct the device so that at different equilibrium positions the tube 11 will move vertically only very small amounts, e. g., a few thousandths of an inch, and the radial displacement of the flyweights during such movement is correspondingly small. As a specific example, with a device wherein the center of mass of the weight is 1¼ inches from the axis of rotation, this radial distance can be made to change as little as 0.005 inch or even less, for variations in the speed of the shaft from, say, 300 to 700 rev. per min. This variation is only 0.4% of the radial distance and will, therefore, cause a negligible deviation in the centrifugal force from the value which is proportional to the square of the angular speed.

As was stated heretofore, the vertical upward thrust against the main bellows 20 is the algebraic sum of the effects of the weight of the vertically movable parts (including the weights of the lever 17, tube 11 and bearings and upwards or downwards thrust transmitted by the fingers 9 due to the static load, if any, of the arms 5 and weights 7), the force of the spring 15, and vertical thrust transmitted by the fingers 9 due to centrifugal force. The pressure within the bellows is exactly proportional to the net upward thrust, so that the pressure may be represented by an equation of the form:

$$\text{Pressure} = K_1 + K_2 + K_3 V^2$$

wherein:

$K_1$ is a constant proportional to the net upward thrust due to the static weight of the vertically movable parts (usually a negative number);

$K_2$ is a constant proportional to the upward thrust of the spring 15 (a positive number in the case of a compression spring, as shown);

$K_3$ is a constant proportional to the mass of the flyweights, nuts 8 and arms 5, and also dependent upon the configuration of the flyball mechanism;

$V^2$ is the angular velocity of the shaft 2.

The constant $K_1$ will be zero if the flyweights assume an equilibrium position at a certain distance away from the axis of rotation beyond their pivot supports 6 such that their static weight urges the tube 11 upwardly with a force exactly equal to the weight of the other vertically moving parts; if these weights are still farther from the axis, $K_1$ is a positive number.

If it is desired to have the pressure exactly proportional to the square of the velocity of the shaft 2 it is evident that $K_1$ and $K_2$ must be equal and of opposite signs. In the usual case, wherein $K_1$ is negative, $K_2$ must be positive, and a compression spring 15 must be provided; this is the form shown in the drawings. When, however, $K_1$ is positive a tension spring should be provided. Finally, the spring 15 may be omitted in the case in which $K_1$ is zero, or when readings which are proportional to the square of the velocity are not required. For precise work it is desirable that the force of the spring remain essentially constant for different equilibrium positions; for this reason the spring should be made long, whereby the compression or elongation during operation is a negligible proportion of its length. This is accomplished by mounting the spring within the elongated tube 11 as shown. The air current from the nozzle 25 exerts a slight downward thrust on the lever 17. This small force can be included in the $K_1$ factor, and is assumed to be constant.

Numerous modifications in the arrangement and construction of the parts may be resorted to without departing from the spirit and scope of the invention. For example, it is not necessary that the nozzle 25 be baffled by the lever 17; its opening could be controlled by a tapered pin carried by the lever to vary the rate of air outflow, or the nozzle may be baffled by a disc or other part which is rotatable with a part of the flyball mechanism. These modifications are shown in Figs. 2 and 3.

In Fig. 2 the nozzle 25a is controlled by a tapered pin 40 mounted on the lever 17a, the nozzle and lever being connected in the same manner as the nozzle 25 and lever 17 of Fig. 1.

Fig. 3 shows not only the modified baffle arrangement for the air nozzle, but a simplification of the entire device wherein the relay valve is eliminated. In this figure the base 1, shaft 2, table 4, arms 5, pivot mountings 6, weights 7, nuts 8, fingers 9, ring 10 and tube 11 are assembled as described for Fig. 1. The cover 13b (which rotates together with the table 4) is extended to above the height of the arms 5 and may be regarded as a part of the movable abutment of the flyball mechanism. An air nozzle 25b is mounted in a part of the frame F with its orifice near to and slightly above the flat upper surface of the cover 13b, which rotates with the table 4. The cover 13b, in its upward and downward movement, baffles the nozzle orifice, thereby regulating the efflux of air.

The top of the tube 11 carries a plug 14a (which may, if desired, retain a spring like the spring 15 of Fig. 1) which is in engagement with a bellows 20, supported in the frame F by a bolt 22 and connected to conduit 24, as previously described. Air under constant pressure, as from a pressure regulated air supply, is admitted through line 27 and passed through a fixed or adjustable constriction, such as an adjustable throttle valve 29b. Throttled air is supplied to the bellows through conduit 24 and to the nozzle 25b through a branch 28b; these conduits are, further, connected directly to the air output conduit 37b, which may be connected to an indicating, recording or controlling instrument, as previously described, which may be of the bleeding or non-bleeding type.

When the device is in equilibrium the net upward force of the tube 11 is exactly balanced by the downward force of the bellows 20. In this position the nozzle 25b is discharging air at a rate such that the pressure drop across the constriction 29b will create the necessary pressure in the conduit 24 and the bellows 20. It should be noted that this pressure drop will depend also upon the rate at which air is bled from the system at the receiving instrument. When the speed of the shaft 2 is increased the upward thrust on the tube 11 is increased and the tube 11, together with the ring 10 and cover 13b, move upwardly; this obstructs the orifice of the nozzle 25b, reducing the rate of discharge of air and, consequently, the pressure drop across the constriction 29b. As a result the air pressure in the conduits 37b and 24 is increased and the bellows 20 moves the tube 11 and the cover 13b downward, until a new equilibrium is established at a higher pressure. Similarly, when the speed of the shaft 2 decreases, the flow of air from the nozzle 25b is increased and the device assumes a new equilibrium at a lower pressure. To facilitate regulation it may be desirable to provide an auxiliary adjustable or fixed constriction 41 in the branch conduit 28b, whereby the pressure at the nozzle will be lower than and less affected by changes of pressure within the conduits 24 and 37b. The constriction 41 is, however, optional.

Fig. 4 shows a modification wherein the relay valve is operated mechanically. In this embodiment the parts 1 through 24 may be constructed and assembled as previously described for Fig. 1. The frame F supports a relay valve 42, secured by a bracket 43 the central chamber of which is connected to the groove 23 and conduit 24 by a duct passageway 44. The relay valve has two transverse partitions, provided with orifices which coact with conical control valves 45 and 46, fixed to a common actuating pin 47. The pin extends through a large opening in the bottom of the valve housing and engages a plate 48 fixed to the free end of the lever 17. Air at constant pressure is admitted to the uppermost compartment of the relay valve through a conduit 27c. The pin 47 may be spring loaded, if desired, but gravity and the pneumatic pressure existing between the three compartments will usually suffice to maintain the pin in engagement with the plate 48. The conduit 24 serves as the air output line and may be connected to an indicating, recording or controlling instrument of any type, as previously described.

It will be noted that the uppermost compartment of the relay valve, i. e., the compartment above the valve 45, will be at the pressure of the air supply; the lowermost compartment, below the valve 46, will be at atmospheric pressure; and the intermediate compartment will be an intermediate pressure dependent upon the vertical position of the valves 45 and 46. Such relay valves are readily constructed to have a maximum travel of the pin 47 as limited by the seating of the control valves of a suitably small distance, e. g., about 0.005 inch.

In operation, the net vertical thrust on the tube 11 is counteracted by the downward thrust of the bellows 20, as described above. An increase in the speed of the shaft 2 raises the tube 11 and plate 48, thereby lifting the pin 47 to decrease the rate of bleeding of air past valve 46, and to increase the inflow of high pressure air past valve 45; this raises the pressure in the intermediate compartment and, consequently, in the duct 44, bellows 20 and air output line 24. The bellows thereupon urges the tube 11 down until a new equilibrium is attained at a higher pressure in the conduit 24. Similarly, a decrease in the speed of the shaft 2 results in a lowering of the pin 47 and the establishment of a new equilibrium at a lower air pressure.

The new equilibrium resulting from a change in the speed of the shaft 2 in all of the embodiments described occur at new positions for the tube 11 which are slightly different from those at the former equilibria, so that the device is not, strictly speaking, a null device. However, the device is practically a null device because the extent of movement of the tube and the radial displacement of the fly weights are so small as to be negligible.

Although the best results are obtained by using a regulated constant pressure supply of fluid, it should be noted that this is not essential because the pressure of the fluid in the pressure responsive device is always balanced directly against the centrifugal force, and the pressure in the output line is, hence, always substantially the same for the same speed of rotation of the flyweight.

The main drawback of using an air supply with a fluctuating pressure is that, for a given constant speed, the movable abutment of the flyball mechanism must assume a slightly different vertical position at equilibrium as the air pressure changes; this causes a very small change in the distance of the flyballs from the axis of rotation and hence results in slightly different pressures in the fluid output line at equilibrium.

While the invention has been described with reference to the use of air in the system, it should be understood that other fluids, either gaseous or liquid, can be used. Moreover, while the fluid pressure responsive element was embodied as a bellows, it is evident that any equivalent device, such as a piston operable within a cylinder containing the fluid, may be substituted.

I claim as my invention:

1. A speed sensing and pressure transmitting unit with a fluid pressure output comprising a flyball mechanism, a fluid pressure responsive element disposed to balance the centrifugal force of the flyball mechanism, a fluid supply conduit in open communication at all times with said pressure responsive element adapted to be connected to a source of high pressure fluid, throttling means in said supply conduit for automatically and continuously reducing the pressure of fluid delivered to said pressure responsive element, normally open variable vent means responsive to changes in the speed of said mechanism for venting a variable quantity of fluid from said pressure responsive element to reduce the fluid pressure acting thereon, said vent means being operable to vent a relatively greater quantity of fluid as the speed of said mechanism is decreased, and a fluid pressure output conduit in pressure communication with said fluid pressure responsive element adapted to be connected to a pressure responsive receiving instrument to transmit thereto a fluid pressure indicative of the speed of the said mechanism.

2. A speed sensing and pressure transmitting unit with a fluid pressure output comprising a flyball mechanism having a movable abutment urged in one direction by the centrifugal force of the flyball mechanism, a fluid pressure responsive element rigidly secured to said abutment to oppose the movement thereof in the said direction, a fluid supply conduit in open communication at all times with said pressure responsive element adapted to be connected to a source of high pressure fluid, throttling means in said supply conduit for automatically and continuously regulating the pressure of fluid delivered to said pressure responsive element, normally open variable vent means responsive to changes in the position of said abutment for venting a variable quantity of fluid from said pressure responsive element to reduce the pressure acting thereon, said vent means being operable to vent a relatively greater quantity of fluid as the speed of said mechanism is decreased, and a fluid pressure output conduit in pressure communication with said fluid pressure responsive element adapted to be connected to a pressure responsive receiving instrument to transmit thereto a fluid pressure indicative of the speed of the said mechanism.

3. The speed sensing and pressure transmitting unit according to claim 2 wherein the throttling means comprises a constriction in the supply conduit.

4. The speed sensing and pressure transmitting unit according to claim 2 wherein the throttling means comprises a normally open fluid relay valve for regulating the flow of fluid through said supply conduit to the pressure responsive element, the relay valve being provided with an actuating rod for operating the valve, and with means for moving said actuating rod in response to movement of said abutment to pass a relatively greater quantity of fluid through said valve as the speed of said mechanism is increased.

5. The speed sensing and pressure transmitting unit according to claim 4 wherein said throttling means and said vent means comprising a fluid relay valve is provided with a pair of control valves one connected to said actuating rod, one for regulating the flow of high pressure fluid toward said pressure responsive element and the other for regulating the discharge of pressure fluid from said pressure responsive element, said control valve being connected so that one of said control valves moves toward its open position while the other moves toward its closed position.

6. The speed sensing and pressure transmitting unit according to claim 4 wherein said actuating rod is mechanically connected to said movable abutment of the flyball mechanism for actuation thereby.

7. A speed sensing and pressure transmitting unit with a fluid pressure output comprising a flyball mechanism having a movable abutment urged in one direction by the centrifugal force of the flyball mechanism, a fluid pressure responsive element disposed to oppose movement of the abutment in the said direction, resilient spring means biasing said abutment in one direction, said resilient spring means and fluid pressure responsive element being adapted to balance the centrifugal force of the flyball mechanism, a fluid supply conduit in open communication at all times with said pressure responsive element adapted to be connected to a source of high pressure fluid, normally open throttling means responsive to movement of said abutment for automatically and continuously varying the pressure of the fluid acting on said pressure responsive element, and a fluid pressure output conduit in pressure communication with said fluid pressure element adapted to be connected to a pressure responsive receiving instrument to transmit thereto a fluid pressure indicative of the speed of the said mechanism.

8. The speed sensing and pressure transmitting unit according to claim 7 wherein the said resilient spring means has a force equal to the static force of said abutment against the pressure responsive element, whereby the transmitted fluid pressure is proportional to the centrifugal force of the flyball mechanism.

9. A speed sensing and pressure transmitting unit with a fluid pressure output comprising a flyball mechanism having a plurality of weights, an abutment mounted for reciprocating movement, linkage including fingers connected to said weights for urging said abutment in one direction in response to the centrifugal force of said weights, a bellows connected to oppose the movement of said abutment in the said direction in accordance with the pressure of fluid therein, a fluid supply conduit in open communication at all times with said bellows adapted to be connected to a source of pressure fluid, throttling means for automatically and continuously regulating the pressure of the fluid admitted through said supply conduit to said bellows, normally open variable vent means responsive to changes in the position of said abutment for venting a variable quantity of fluid from said bellows to reduce the pressure therein, said vent means being operable to vent a relatively greater quantity of fluid as the speed of said mechanism is decreased, and a fluid pressure output conduit in flow communication with said bellows adapted to be connected to a pressure responsive receiving instrument to transmit thereto a fluid pressure indicative of the speed of the said mechanism.

10. In combination with the speed sensing and pressure transmitting unit according to claim 9, resilient means biasing said abutment in one direction for controlling the relation between the centrifugal force of the weights and the pressure transmitted through said pressure output conduit.

11. A speed sensing and pressure transmitting unit with a fluid pressure output comprising a flyball mechanism, a lever pivotally mounted and connected to said flyball mechanism at an intermediate point of the lever for pivotal movement in one direction in response to the centrifugal force of said mechanism, a fluid pressure responsive element disposed to oppose movement of the lever in the said direction, a fluid supply conduit in open communication at all times with said pressure responsive element adapted to be connected to a source of high pressure fluid, throttling means in said supply conduit for automatically and continuously reducing the pressure of fluid delivered to said pressure responsive element, normally open variable vent means responsive to changes in the position of a part of said lever remote from its pivot point and beyond said intermediate point thereof for venting a variable quantity of fluid from said pressure responsive element to reduce the pressure acting thereon, said vent means being operable to vent a relatively smaller quantity of fluid when said lever moves in the said direction, and a fluid pressure output conduit adapted to be connected to a pressure responsive receiving instrument to transmit thereto a fluid pressure indicative of the speed of the said mechanism.

12. The speed sensing and pressure transmitting unit according to claim 11 wherein the pressure regulating means and vent means comprise a fluid relay valve interposed in said supply conduit and having a first control valve regulating the flow of fluid through said supply conduit and a second control valve regulating the discharge of fluid through said vent, and an actuating rod mechanically connected to said lever at said remote point thereof for actuating said control valves.

13. The speed sensing and pressure transmitting unit according to claim 11 wherein the pressure regulating means and vent means comprise a fluid relay valve interposed in said supply conduit and having a first control valve regulating the flow of fluid through said supply conduit and a second control valve regulating the discharge of fluid through said vent, an actuating rod for actuating said control valves, air bellows for said actuating rod, an air conduit for supplying air to said air bellows, a constriction in said air conduit, an air nozzle connected in said air conduit between the bellows and the constriction, and means on said lever for varying the discharge of air from said nozzle in accordance with the position of said lever.

14. A speed sensing and pneumatic pressure transmitting unit with a pneumatic pressure output comprising a flyball mechanism, an air pressure responsive element disposed to balance the centrifugal force of the flyball mechanism, an air supply conduit in open communication at all times with said pressure responsive element adapted to be connected to a source of high pressure air, throttling means in said supply conduit for reducing the pressure of air delivered to said pressure responsive element while permitting at least a small amount of air to flow therethrough, normally open variable vent means responsive to changes in the speed of said mechanism for venting a variable quantity of air from said pressure responsive element to reduce the fluid pressure acting thereon, said vent means being operable to vent a relatively greater quantity of air as the speed of said mechanism is decreased, and an air pressure output conduit in flow communication adapted to be connected to a pressure responsive receiving instrument to conduct a small quantity of air continuously and to transmit to said instrument an air pressure indicative of the speed of the said mechanism.

JOSEPH G. WILSON.

REFERENCES CITED

The following references are of record in the file of this patent:

UNITED STATES PATENTS

| Number | Name | Date |
| --- | --- | --- |
| 811,666 | Schulhoff | Feb. 6, 1906 |
| 1,718,673 | Wettstein | June 25, 1929 |
| 1,976,820 | Wettstein | Oct. 16, 1934 |
| 2,153,381 | Maas | Apr. 4, 1939 |
| 2,155,247 | Warner | Apr. 18, 1939 |

FOREIGN PATENTS

| Number | Country | Date |
| --- | --- | --- |
| 114,836 | Great Britain | 1919 |
| 318,486 | Great Britain | June 19, 1930 |